(12) United States Patent
Raduchel et al.

(10) Patent No.: US 6,338,138 B1
(45) Date of Patent: Jan. 8, 2002

(54) NETWORK-BASED AUTHENTICATION OF COMPUTER USER

(75) Inventors: William J. Raduchel, Palo Alto; Abhay Gupta, Milipitas; Yvonne Wilson, Mountain View, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/106,304

(22) Filed: Jun. 29, 1998

Related U.S. Application Data

(60) Provisional application No. 60/072,714, filed on Jan. 27, 1998.

(51) Int. Cl.[7] .............................................. H04L 9/00
(52) U.S. Cl. ...................... 713/155; 713/152; 713/164; 713/183; 713/185; 705/65; 705/67; 705/72; 705/73; 380/232
(58) Field of Search ................................. 713/159, 165, 713/166, 183, 185, 2, 152, 155, 164, 172; 705/67, 65, 72, 73; 380/232

(56) References Cited

U.S. PATENT DOCUMENTS

| | | | | |
|---|---|---|---|---|
| 4,962,449 A | * | 10/1990 | Schlesinger | ................. 364/200 |
| 5,237,614 A | * | 8/1993 | Weiss | .......................... 380/23 |
| 5,666,293 A | * | 9/1997 | Metz et al. | .............. 395/200.5 |
| 5,768,539 A | * | 6/1998 | Metz et al. | ............ 395/200.79 |
| 5,771,291 A | * | 6/1998 | Newton et al. | ................ 380/25 |
| 5,787,177 A | * | 7/1998 | Leppek | ......................... 380/25 |
| 5,802,530 A | * | 9/1998 | Van Hoff | ..................... 707/513 |
| 5,812,819 A | * | 9/1998 | Rodwin et al. | ............. 395/500 |
| 5,841,970 A | * | 11/1998 | Tabuki | ................... 395/187.01 |
| 5,892,905 A | * | 4/1999 | Brandt et al. | ........... 395/187.01 |

(List continued on next page.)

FOREIGN PATENT DOCUMENTS

| | | | | |
|---|---|---|---|---|
| DE | 196 10 314 A1 | * | 9/1997 | ........... G06F/12/14 |
| EP | 0 798 655 A2 | * | 1/1997 | ........... G06F/17/30 |
| EP | 0 798 655 A2 | | 10/1997 | |
| WO | WO 96/42041 | | 12/1996 | |
| WO | 96/42041 | * | 12/1996 | |

OTHER PUBLICATIONS

Windows NT Security Handbook (Tom Sheldon, 1997, pp. 83–85).*

Distributed Systems Concepts and Design, Second Edition, G. Coulouris et al., pp. 221–233, 1996.

*Primary Examiner*—Albert Decady
*Assistant Examiner*—Paul Callahan
(74) *Attorney, Agent, or Firm*—Finnegan, Henderson, Farabow, Garrett & Dunner, L.L.P.

(57) ABSTRACT

A network-based authentication scheme is provided that performs authentication in a centralized manner for the stand-alone computers of a particular organization. Since authentication is centralized, the individual computers do not need to store authentication information, and control over all of the computers rests in a single location, enabling the system administrator to manage access and utilization of the computers from this location. The network-based authentication scheme includes an authentication manager, remotely located with respect to a local computer, that performs authentication for the local computer. The authentication manager receives login information from the local computer, verifies this information against an authentication file, and returns indications of the services on the local computer that the user is able to utilize. The local computer receives these indications and displays icons representing the services available to that user. The user may then select an icon, causing an applet to be downloaded from the authentication manager onto the local computer to facilitate the user's utilization of the corresponding service.

25 Claims, 6 Drawing Sheets

U.S. PATENT DOCUMENTS

| | | | |
|---|---|---|---|
| 5,953,005 A | * 9/1999 | Liu | 345/302 |
| 5,958,016 A | * 9/1999 | Chang et al. | 709/229 |
| 5,978,834 A | * 11/1999 | Simonoff et al. | 709/203 |
| 5,978,855 A | * 11/1999 | Metz et al. | 709/249 |
| 5,987,506 A | * 11/1999 | Carter et al. | 709/213 |
| 5,987,611 A | * 11/1999 | Freund | 713/201 |
| 6,005,568 A | * 12/1999 | Simonoff et al. | 345/335 |
| 6,012,100 A | * 1/2000 | Frailong et la. | 709/250 |
| 6,049,877 A | * 4/2000 | White | 713/201 |
| 6,070,243 A | * 5/2000 | See et al. | 713/201 |
| 6,115,471 A | * 9/2000 | Oki et al. | 380/342 |
| 6,125,384 A | * 9/2000 | Brandt et al. | 709/203 |

* cited by examiner

NETWORK-BASED AUTHENTICATION OF COMPUTER USER

RELATED APPLICATION

The following identified U.S. provisional patent application is relied upon and is incorporated by reference in this application: Provisional U.S. patent application No. 60/072,714, entitled, "Integration of a Stand-Alone Computer into a Network-Based Computing Environment," filed on Jan. 27, 1998.

FIELD OF THE INVENTION

The present invention relates generally to data processing systems and, more particularly, to network-based authentication of a computer user.

BACKGROUND OF THE INVENTION

Conventional stand-alone computers typically perform their own authentication, a process known as local authentication. A "stand-alone computer" refers to a computer that is fully functional without having to connect to another device. Since the computer is fully functional, it has a processor, input/output capabilities, and an operating system with a file system. Conventional stand-alone computers perform local authentication by authenticating a user when the user attempts to log into the computer and then, based upon the outcome of the authentication, by either allowing or inhibiting the user form using the services of the computer. The term "services" refers to functionality provided by the computer system, such as access to the file system, e-mail system, or calendaring system.

Performing local authentication has its drawbacks in certain environments. Specifically, performing local authentication in a large organization is difficult because a large organization typically has many users using many interconnected computers, and multiple users may utilize the same computer. In such an organization, the computers are interconnected via a network, such as a local-area network, wide-area network, or the Internet, and it would be very difficult to enable each computer to authenticate any user that may want to use it. Another drawback is that a system administrator is typically unable to control access and use of each of the individual computers unless he configures each one individually. Such an effort is very time consuming and is not practical for large organizations. It is therefore desirable to improve the authentication scheme of computers that are interconnected by a network.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

SUMMARY OF THE INVENTION

Figure 1:
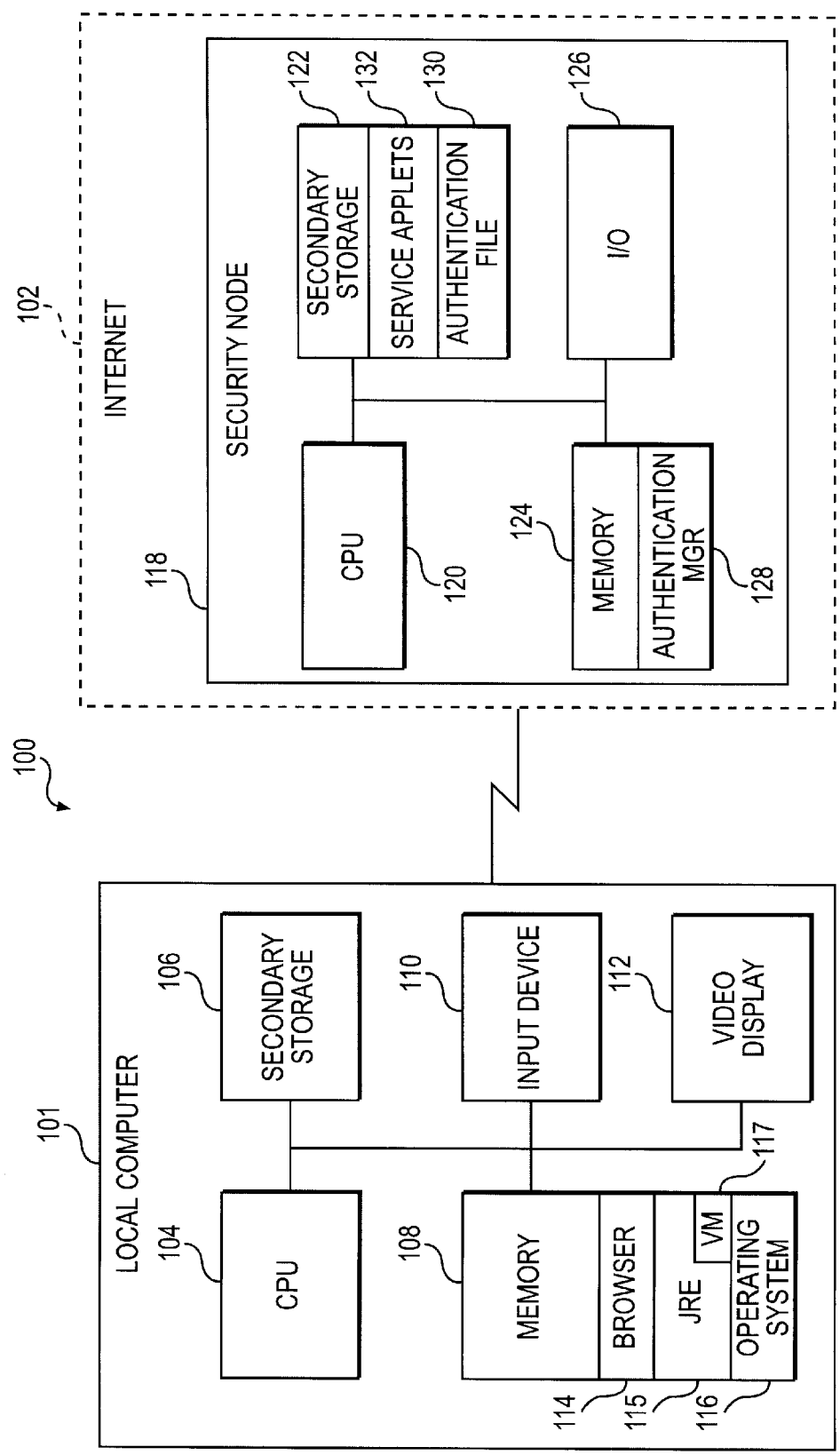
FIG. 1 depicts a data processing system suitable for use with methods and systems consistent with the present invention.

A network-based authentication scheme is provided that performs authentication in a centralized manner for the interconnected stand-alone computers of a particular organization. Since authentication is centralized, the individual computers do not need to store authentication information, and authentication control over all of the computers rests in a single location, enabling a system administrator to manage access and utilization of the computers from this location.

In accordance with methods and systems consistent with the present invention, an authentication manager, remotely located with respect to a local computer, performs authentication for the local computer. The authentication manager receives login information from the local computer, verifies this information against an authentication file, and returns indications of the local computer services that the user is able to utilize. The local computer receives these indications and displays icons representing the services available to that user. The user may then select an icon, causing an applet to be downloaded from the authentication manager (or another server) onto the local computer to facilitate the user's utilization of the corresponding service.

In accordance with methods consistent with the present invention, a method for performing authentication in a computer system with services is provided. According to this method, an identification of a user is received, the identification is sent to a remote location to determine which among the services the user is authorized to use, and code is received that facilitates use of at least one of the services, where the user has been authorized to use this service.

In accordance with methods consistent with the present invention, a method for performing authentication in a data processing system having an authentication server and a computer system with services is provided. The authentication server performs the method by receiving an identification of the user of the computer system, by determining which among the services the user is authorized to use, and by sending to the computer system code that facilitates use of the services that the user is authorized to use.

In accordance with systems consistent with the present invention, a data processing system with services and a user is provided. This data processing system includes a security node and a computer system. The security node includes an authentication manager configured to receive an identification of the user, configured to authenticate the user based on the identification, and configured to return code that facilitates use of the services when the user has been authenticated. The computer system includes a browser configured to receive the user identification, configured to send the user identification to the authentication manager, configured to receive the code, and configured to invoke the code to facilitate the use of the services by the user when the user has been authenticated.

DETAILED DESCRIPTION

Methods and systems consistent with the present invention provide an improved authentication scheme. This authentication scheme centralizes authentication-related processing in an authentication manager so that the network administrator may easily control both the access and the use of each computer on the administrator's network.

Overview

In accordance with methods and systems consistent with the present invention, a computer system may perform a number of services. Some of these services are local to the computer in that they are performed by the operating system. Other services are downloaded from the authentication manager (or another server) upon authentication (e.g., application programs like e-mail and calendaring). In the situation where the services are provided by the operating system, the user is unable to utilize the services until authentication is successfully completed and the user is granted access to those services. To gain access to one of these services, code must be downloaded from the authentication manager, in the form of an applet, that provides a user interface to the service. For example, if the service is a file system, the applet provides a command line or other graphical user interface so that the user could enter commands to manipulate the file system. An "applet" comprises code that usually runs in another program like a browser. In the situation where the services are remote, the user is unable to utilize the services because the code that performs the services are applets downloaded from the authentication manager (or other server) only after successful authentication.

In accordance with methods and systems consistent with the present invention, when a stand-alone computer starts up, the user is unable to utilize any of the services of the computer until an authentication process is successfully completed. To perform authentication, the computer runs a browser with an applet that displays a logon screen to the user, who then enters log-in information (e.g., username and password). Upon receiving this log-in information, the applet transfers it to an authentication manager, remotely located somewhere in the network, that determines whether the user should be able to use all the available services of the computer or only a limited subset of the available services. If the user is authenticated, the authentication manager enables the user to use additional services of the computer, such as access to files, change calendar information, and access to applications that the user is otherwise authorized to use. To do so, the authentication manager downloads to the browser an indication of the services the user is able to use. The browser then displays icons indicating each of these services, and the user may select the icons, causing applets that either perform these services or provide access to these services to be downloaded to the browser and run, thus enabling the user to utilize the services.

If the user is not authenticated, the authentication manager enables him to only utilize a subset of the services provided by the computer, such as calendaring and e-mail; he is unable to utilize other services provided by the computer such as accessing the local file system. To enable the user to use this subset, the authentication manager downloads an indication of the services the user is allowed to use, and the browser displays icons which, when selected, cause applets to be downloaded that facilitate use of these services.

Implementation Details

FIG. 1 depicts a data processing system 100 suitable for use with methods and systems consistent with the present invention. Data processing system 100 comprises local computer 101 connected to the Internet 102. Local computer 101 is a stand-alone computer and hence is fully functional, containing central processing unit (CPU) 104, secondary storage device 106, memory 108, input device 110, and video display 112. Memory 108 contains browser 114, Java™ Runtime Environment 115, and operating system 116. The browser 114 provides access to web pages on the Internet 102 and runs on the Java Runtime Environment 115. An example of a suitable browser is the HotJava Browser available from Sun Microsystems of Palo Alto, Calif. The Java Runtime Environment 115 includes Java™ Virtual Machine 117, which acts like an abstract computing machine, receiving instructions in the form of bytecodes and interpreting the bytecodes by dynamically converting them into a format suitable for execution on the processor and by executing them. The Java Virtual Machine is described in greater detail in Lindholm and Yellin, *The Java Virtual Machine Specification*, Addison-Wesley (1997), which is incorporated herein by reference.

Internet 102 contains security node 118 with CPU 120, secondary storage device 122, memory 124, and at least one I/O device 126. Secondary storage device 122 contains authentication file 130, storing the data against which users are authenticated, and service applets 132, facilitating use of various computer services when downloaded to browser 114. Authentication file 130 contains the user name and password for authenticated users. Alternatively, one skilled in the art will appreciate that the authentication file 130 may contain information for performing authentication with digital token cards, such as enigma cards or information for performing authentication using digital certificates (such as x.509).

Service applets 132 facilitate use of a particular service when downloaded and run in browser 114 of local computer 101. For example, one service applet may be a file system applet providing a command-line user interface or graphical user interface that allows a user to manipulate the file system. Such an applet may be constructed using well-known user interface techniques to interact with the user and may use the Java™ class libraries to manipulate the file system. In this case, the applet is "signed" or authenticated such that it can provide access to the file system. The Java class libraries are described in greater detail in Chan and Lee, *The Java Class Libraries: An Annotated Reference*, Addison-Wesley (1997), which is incorporated herein by reference. Other examples of service applets include an e-mail applet and a calendar applet that perform either well-known e-mail functionality or time-management functionality, respectfully.

Although data processing system 100 depicts one computer being authenticated by the authentication manager, one skilled in the art will appreciate that the authentication manager may be used to perform authentication for many computers. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Furthermore, although local computer 101 is depicted as being connected to the Internet, one skilled in the art will appreciate that, instead of the Internet, the local computer may be connected to other networks like an Intranet or other local-area or wide-area networks. Sun, Sun Microsystems, the Sun Logo, Java and Java-based trademarks are trademarks or registered trademarks of Sun Microsystems Inc. in the United States and other countries.

Figure 2:
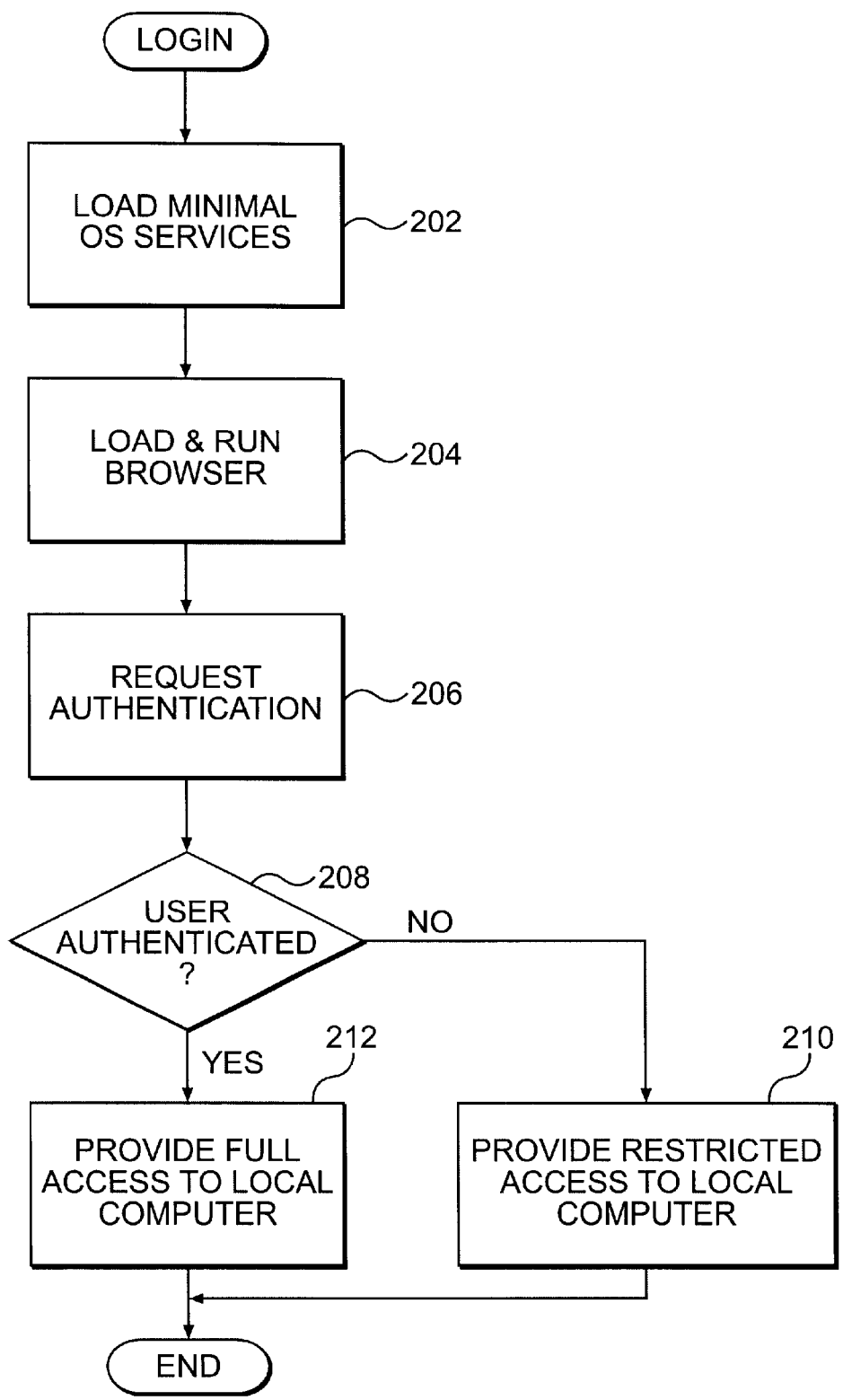
FIG. 2 depicts a flow chart of the steps performed during login to the local computer depicted in FIG. 1.

Methods and systems consistent with the present invention are described in greater detail with reference to FIG. 2, which depicts a flowchart of the steps performed at start-up time of local computer 101. When the local computer is initially started, a small portion of the operating system is loaded (step 202). In this step, the minimum code necessary to run authentication is loaded, including VM 117 as well as the minimum components of the operating system necessary to load and run a web browser; it does not include a command interpreter or file capabilities.

Figure 3:
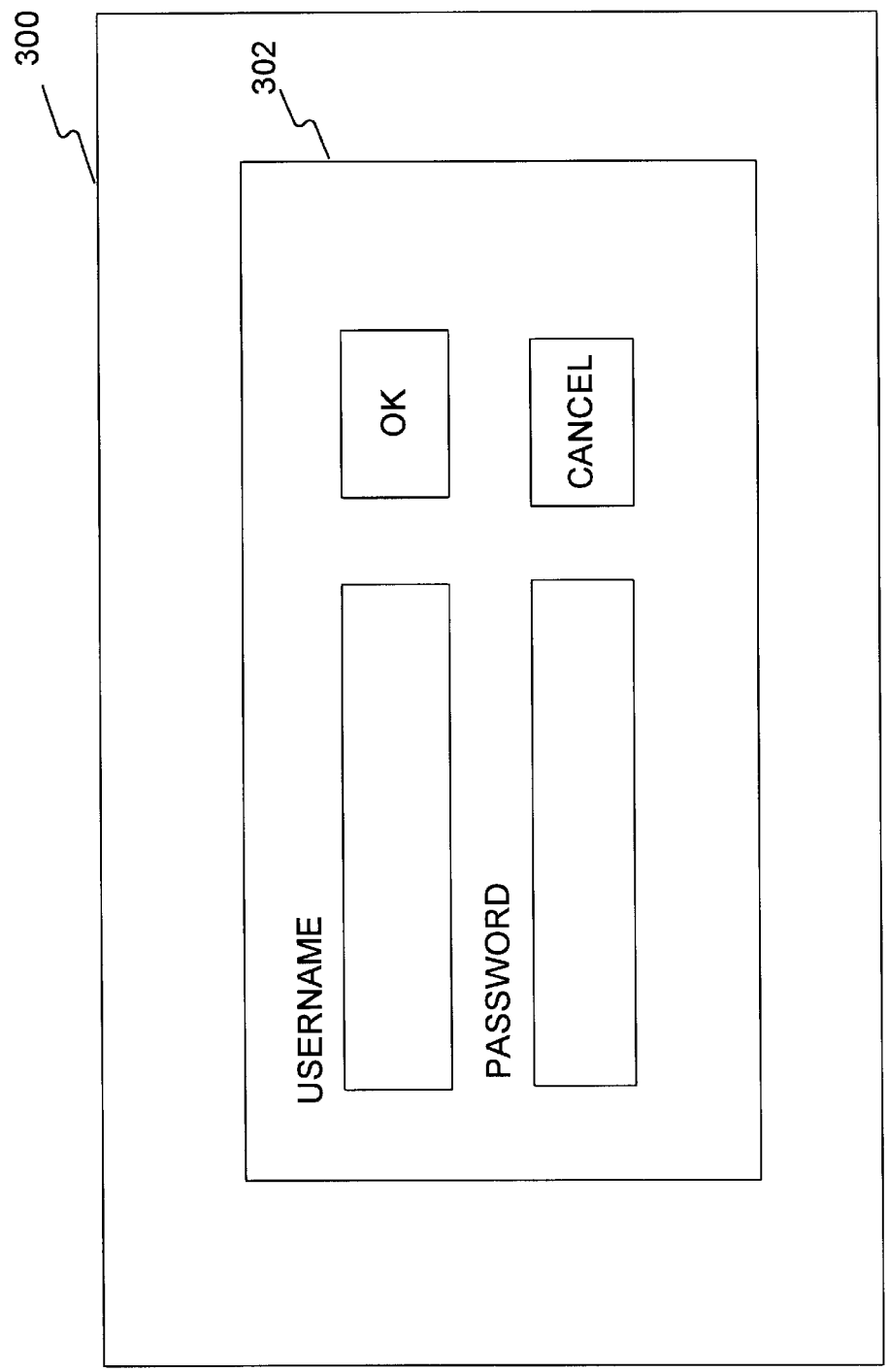
FIG. 3 depicts a login screen presented by the browser depicted in FIG. 1.

Next, the browser is loaded and run (step 204). As shown in FIG. 3, when running the browser, the user is initially presented with a screen 300 having a login dialog box 302 into which the user can enter their username and password. This screen is displayed by an applet, stored with the browser, that performs authentication by communicating with the authentication manager. In an alternative embodiment, the user enters a user name and is prompted with a challenge number which is entered into a digital token card and the resulting password is entered into the system. In another alternative embodiment, the local computer includes a smartcard reader and the user inserts a smartcard into the reader. However received, the authentication information, including the username and password, is sent by the browser to the authentication manager using the well-known HyperText Transfer Protocol (HTTPS), and using the well-known Secure Socket Layer (step 206).

Figure 4:
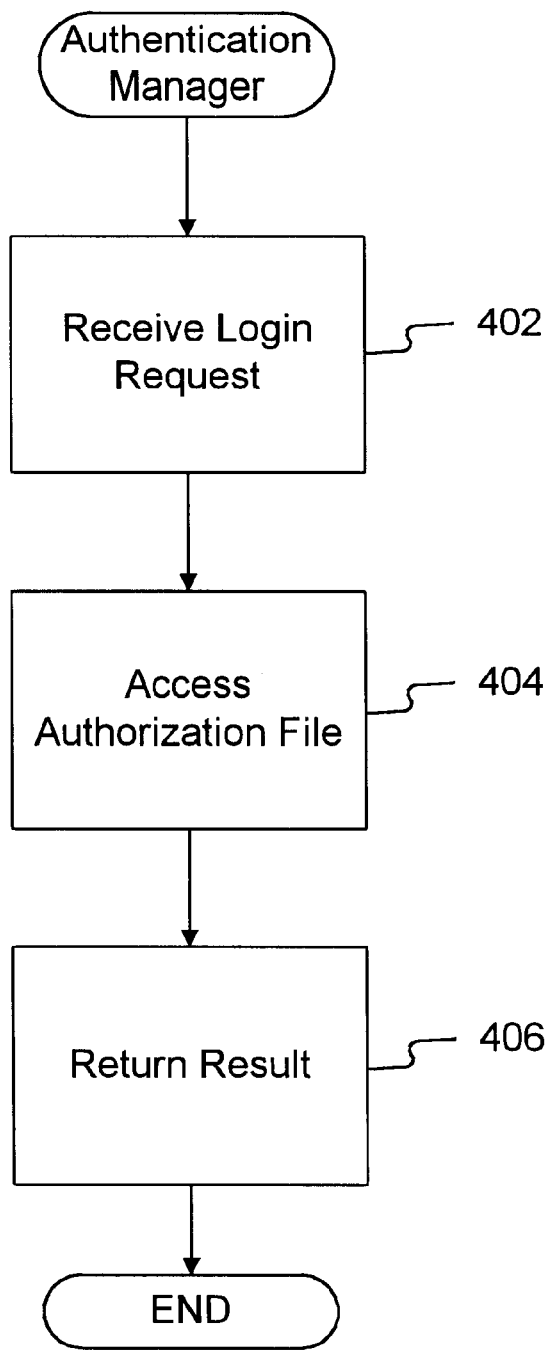
FIG. 4 depicts a flow chart of the steps performed by the authentication manager depicted in FIG. 1.

The authentication manager receives the log-in information and uses it to authenticate the user, as shown in FIG. 4. Although various embodiments of the authentication manager may vary and could be configurable, in one implementation, the authentication manager receives a log-in request containing a user name and password (step 402 in FIG. 4). After receiving this information, the authentication manager authenticates the user by accessing the authentication file to determine if the user name and password are contained in it (step 404) and returns a token that identifies the services that the user may use (step 406). Additionally, this token may contain a profile of the user's access rights, and when the token is returned to the local computer, it would be included in all further requests from the local computer.

Returning to FIG. 2, the local computer receives the authentication results from the authentication manager and determines if the user was authenticated (step 208). If authentication fails (i.e., the returned token indicates only a limited number of services), the user is allowed only to perform actions considered non-invasive, such as sending and receiving e-mail, viewing publicly available, non-proprietary web pages via the browser, or viewing on-line calendars. However, if authentication is successful, the user may use all of the available services of the local computer. One skilled in the art will appreciate that, if authentication fails, one embodiment of the present invention may inhibit the user from using any of the computer's services. In this case, no applets are allowed to be downloaded.

Figure 5:
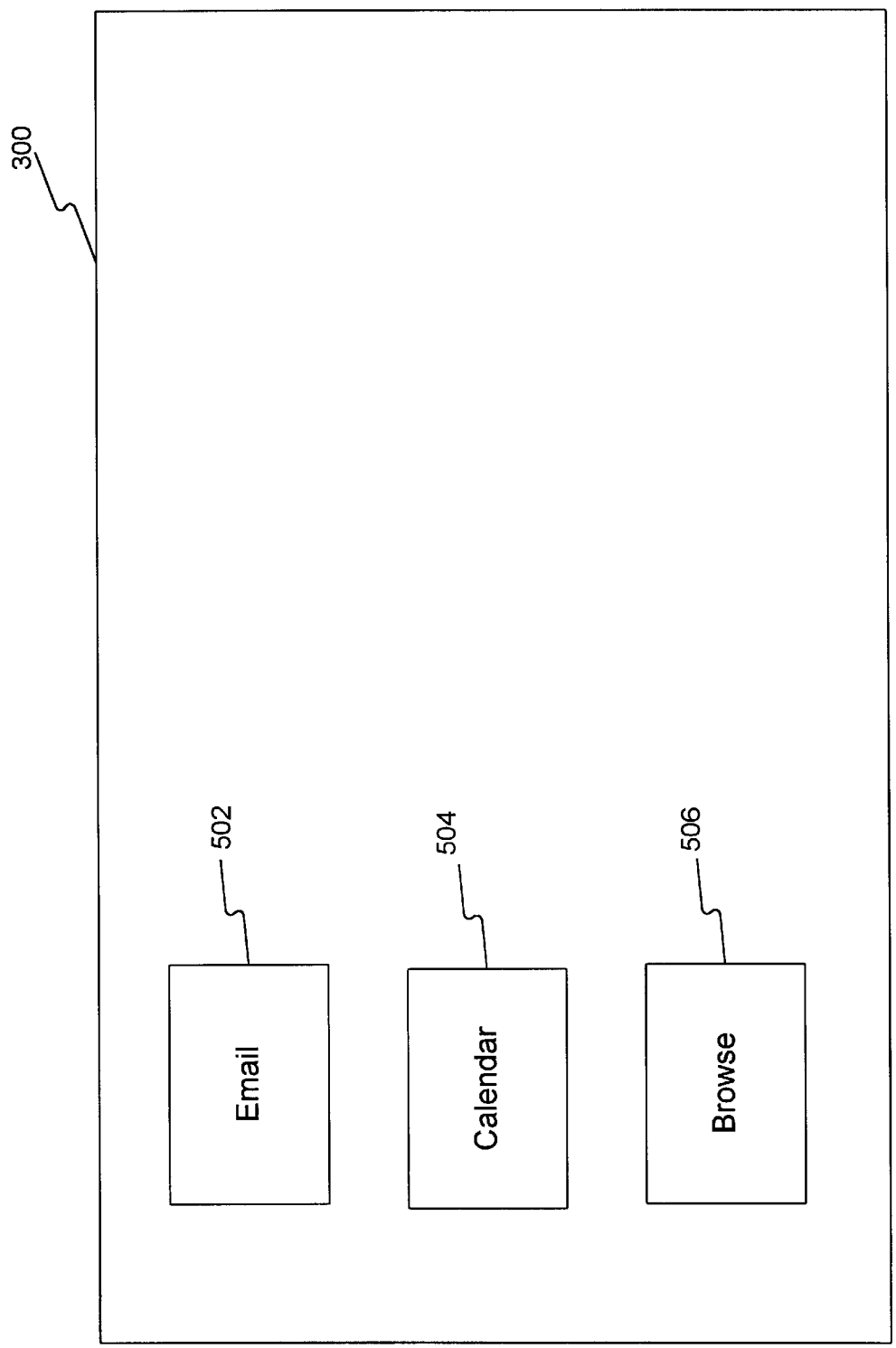
FIG. 5 depicts the browser of FIG. 1 displaying icons representing available services to the user.

If authentication fails, the browser provides the user with restricted access to the local computer (step 210). In this step, the browser displays icons representative of the services that the user may use, as indicated in the token received from the authentication manager. For example, FIG. 5 depicts the browser screen 300 with three icons: icon 502, allowing the user to access an e-mail system; icon 504, allowing the user to use a time management program; and icon 506, allowing the user to browse various web pages on the Internet. Upon selecting one of the icons 502–506 for the first time, the browser sends a request to the authentication manager for the appropriate service applet, and the authentication manager downloads it to the browser so that the user may use the corresponding service. Subsequent selections of the icon do not cause a download of the service applet; instead, recognizing that a copy has already been downloaded, the browser merely invokes that copy. Also as part of this step, the browser's security level is set to the highest possible setting, resulting in the user's inability to either run programs or access network resources such as files, because the user does not have access to the operating system command interpreter.

In an alternative implementation, all applications are run on servers remote from the local computer. In this situation, all requests for services originating from the local computer include the user's authentication token and pass through the authentication manager, where it is validated (to preclude tampering) and the request as well as the authorization profile (from the authentication file) are forwarded to the appropriate application manager. The application manager then uses this information to decide to what extent to fulfill or respond to the client request.

Figure 6:
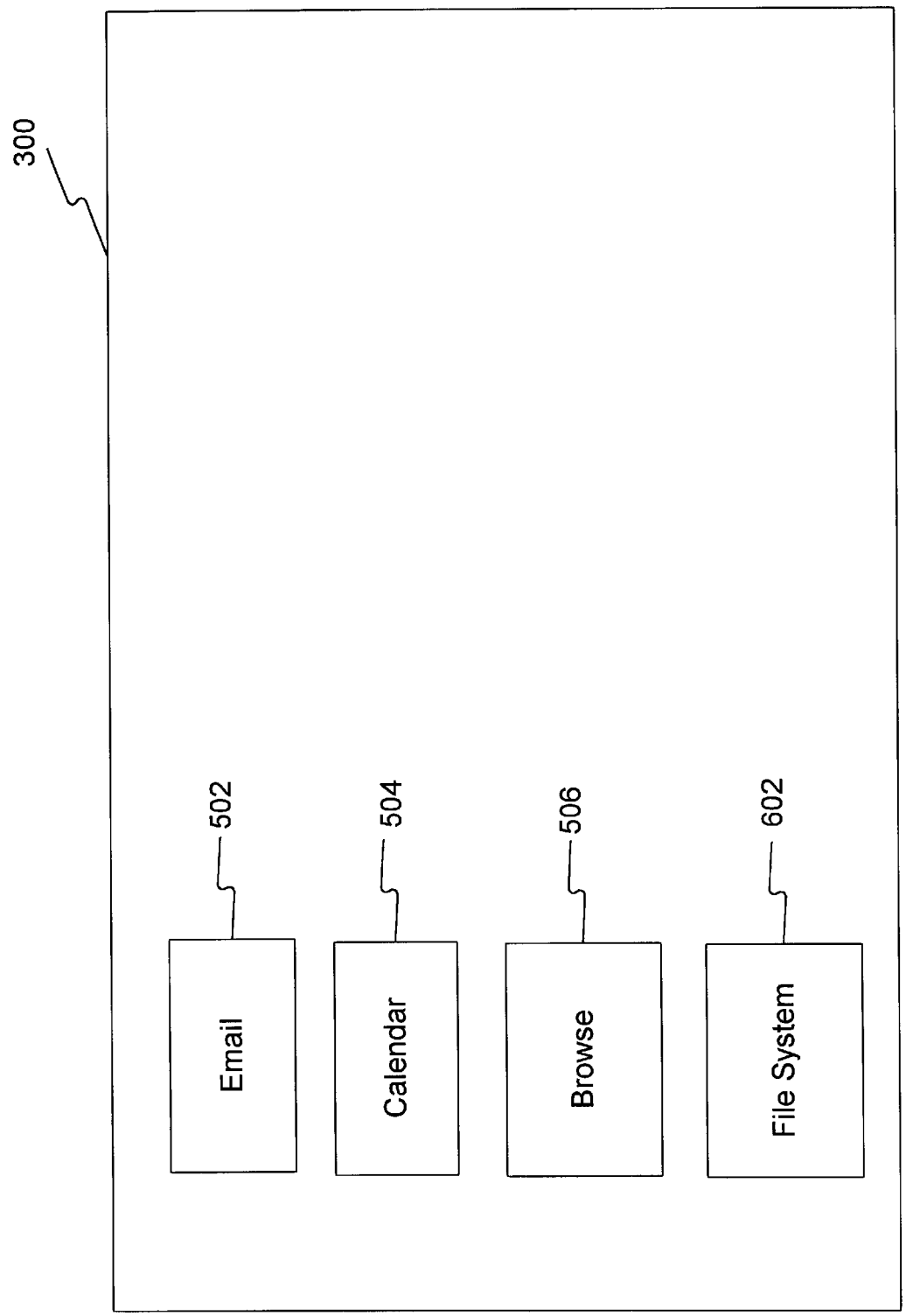
FIG. 6 depicts the browser of FIG. 1 displaying icons representing all the services available on the local computer.

When the authentication manager determines that an authorized user is present, the authentication token returned to the local computer indicates that the user can utilize all of the available services on the local computer (step 212). In this case, the user has access to a much greater range of capabilities, such as running a variety of programs and accessing numerous local files through their web browser. The user may be granted access to an operating system command interpreter and/or to files via a client application which provides access to directories exported via the well-known Network File System (NFS). Again, the browser displays icons indicating the services to which the user has access. For example, FIG. 6 depicts the browser screen 300 displaying four icons: the e-mail icon 502, the calendar icon 504, the browse icon 506, and the file system icon 602. Upon selection of the file system icon 602, an applet facilitating access to the local file system is downloaded from the authentication manager and run.

Although the present invention has been described with reference to a preferred embodiment thereof, those skilled in the art will know of various changes in form and detail which may be made without departing from the spirit and scope of the claimed invention as defined in the appended claims and their full scope of equivalents.

What is claimed is:

1. A method in a data processing system having at least one stand-alone computer system and a security node that is remotely located with respect to the at least one computer system and connected via a network, the security node having an authentication manager that is capable of authenticating a plurality of stand-alone computer systems, the at least one stand-alone computer system having a set of services, the method comprising:

starting up the at least one stand-alone computer system;

inhibiting a user from utilizing the services of the at least one stand-alone computer system responsive to the starting up of the at least one stand-alone computer system;

displaying a browser with a login screen prompting the user for identification;

receiving the identification from the user and sending the identification to the authentication manager;

attempting to authenticate the user by the authentication manager;

determining by the browser whether the authentication manager has authenticated the user;

downloading first code to the at least one stand-alone computer system that facilitates use of a portion of the set of services of the at least one stand-alone computer system when the user has not been authenticated; and downloading second code to the at least one stand-alone computer system that facilitates use of the set of the services of the at least one stand-alone computer system when the user has been authenticated.

2. The method of claim 1 wherein the downloading first code includes:

displaying, by the browser, icons representing the portion of the set of services available to the user, and providing the first code responsive to user selection of the icons.

3. The method of claim 1 wherein the downloading second code includes:

displaying, by the browser, icons representative of the set of services, and providing the second code responsive to user selection of the icons.

4. The method of claim 1 wherein each of the services of the stand-alone computer system is facilitated by an applet managed by the authentication manager, and wherein the downloading first code includes:

providing from a remote location applets to facilitate use of the portion of the set of services by the user.

5. The method of claim 1 wherein each of the services of the stand-alone computer system is facilitated by an applet managed by the authentication manager, and wherein the downloading second code includes:

downloading applets to facilitate use of the set of services by the user.

6. The method of claim 1 wherein the downloading first code includes:

running the portion of the set of services on the stand-alone computer system.

7. The method of claim 6 wherein the stand-alone computer system has a virtual machine, and wherein the running includes:

running the portion of the set of services on the virtual machine.

8. The method of claim 1 wherein the downloading second code includes:

running the set of services on the stand-alone computer system.

9. The method of claim 8 wherein the stand-alone computer system has a virtual machine, and wherein the running includes:

running the set of services on the virtual machine.

10. A method for performing authentication in a computer system with services comprising:

receiving information identifying a user;

sending, at least part of the information to a remote location for verification of the user and determination of which among the services the user is authorized to use;

receiving a first code that facilitates access to at least one of the services, the user not being verified; and receiving second code that facilitates access to at least one of the services, the user being authorized to use the at least one of the services.

11. The method of claim 10, wherein the computer system includes a browser and wherein the receiving includes:

displaying by the browser a log-on screen to the user requesting the identification.

12. The method of claim 10, wherein the receiving an identification includes:

inhibiting use of the services until it is determined which among the services the user is authorized to use.

13. A method of performing authentication in a data processing system having at least one computer system with services and an authentication server, remotely located with respect to the at least one computer system and capable of authenticating a plurality of computer systems, the method performed by the authentication server comprising:

receiving an identification of a user of the at least one computer system;

determining based on the identification of the user which among the services the user was previously authorized to use;

providing a first code that facilitates use of at least one of the services when it is determined that the user is not authorized to use; and sending to the at least one computer system second code that facilitates use of at least one of the services that the user is authorized to use.

14. The method of claim 13 wherein the code is contained in an applet, and wherein the sending includes:

sending the applet to the computer system to facilitate use of the at least one of the services that the user is authorized to use.

15. A data processing system with services and a user comprising:

a security node with an authentication manager configured to receive an identification of a user, configured to authenticate a user based on the identification, configured to return first code that facilitates use of at least one of the services when a user has not been authenticated and configured to return second code that facilitates use of at least one of the services when the user has been authenticated; and at least one computer system with a browser configured to receive the identification, configured to send the identification to the authentication manager, configured to receive the first code from the authentication manager, configured to invoke the first code to facilitate use of at least one of the services by the user when the user has not been authenticated, configured to receive the code returned from the authentication manager, and configured to invoke the code to facilitate use of the services by the user when the user has been authenticated, wherein the security node is remotely located with respect to the at least one computer system, and wherein the authentication manager is capable of authenticating a plurality of computer systems.

16. The data processing system of claim 15 wherein the code is an applet.

17. The data processing system of claim 15 wherein the computer system includes a virtual machine and wherein the browser runs on the virtual machine.

18. A computer-readable medium containing instructions for controlling a computer system to perform a method for performing authentication in a computer system having services, the method comprising:

receiving an identification of a user;

sending the identification to a remote location for verification of the information and determination of which among the services the user is authorized to use;

receiving a first code that facilitates access to at least one of the services, the user not being verified; and receiving second code that facilitates access to at least one of the services, the user being authorized to use the at least one of the services.

19. The computer-readable medium of claim 18, wherein the computer system includes a browser and wherein the receiving includes:

displaying by the browser a log-on screen to the user requesting the identification.

20. The computer-readable medium of claim 18, wherein the receiving an identification includes:

inhibiting use of the services until it is determined which among the services the user is authorized to use.

21. A computer-readable medium containing instructions for controlling a data processing system to perform a method for performing authentication, the data processing system having at least one computer system with services and an authentication server, remotely located with respect to the at least one computer system, capable of authenticating a plurality of computer systems, the method performed by the authentication server comprising:

receiving an identification of a user of the at least one computer system;

verifying the identification of the user;

determining which among services the user is authorized to use;

sending to the at least one computer system first code that facilitates use of at least one of the services when the user is not verified;

sending to the at least one computer system second code that facilitates use of at least one of the services that the user is authorized to use.

22. The computer-readable medium of claim 21 wherein the code is contained in an applet, and wherein the sending includes:

sending the applet to the computer system to facilitate use of the at least one of the services that the user is authorized to use.

23. A data processing system having at least one stand-alone computer system and a security node that is remotely located with respect to the at least one computer system and connected via a network, the security node having an authentication manager capable of authenticating a plurality of stand-alone computer systems, the at least one stand-alone computer system having a set of services, the data processing system comprising:

means for starting up the at least one stand-alone computer system;

means for inhibiting a user from utilizing the services of the at least one stand-alone computer system responsive to the starting up of the at least one stand-alone computer system;

means for displaying a browser with a login screen prompting the user for identification;

means for receiving the identification from the user and sending the identification to the authentication manager;

means for authenticating the user by the authentication manager;

means for determining by the browser whether the authentication manager has authenticated the user;

means for downloading first code to the at least one stand-alone computer system that facilitates use of a portion of the set of services of the at least one stand-alone computer system when the user has not been authenticated; and means for downloading second code to the at least one stand-alone computer system that facilitates use of the set of the services of the at least one stand-alone computer system when the user has been authenticated.

24. A method for performing authentication in a network comprising at least one computer system with services and an authentication server, remotely located with respect to the at least one computer system, capable of authenticating a plurality of computer systems, the method performed by the authentication server comprising:

receiving an identification of a user of the at least one computer system;

determining, based on the identification of the user, any of the services the user was previously authorized to use; and providing an authorization signal to the at least one computer system, wherein the authorization signal authorizes limited access to services of the at least one computer system when it is determined that user was not previously authorized to use any of the services and the authorization signal authorizes unlimited access to services of the at least one computer system that the user was previously authorized to use when it is determined that the user was previously authorized to use those services.

25. A method for performing authentication in a network comprising at least one computer system with services and an authentication server, remotely located with respect to the at least one computer system, capable of authenticating a plurality of computer systems, the method performed by the at least one computer system comprising:

initially preventing a user from all services at start-up of the at least one computer system;

prompting the user to input identification information;

providing the identification information to the authentication server for determination of any services of the at least one computer system previously authorized for use by the user;

receiving from the authentication server an authorization code indicating the services of the at least one computer system available for previously authorized use by the user and an authorization code indicating that the user is permitted limited use of specific services; and displaying a set of selectable icons, each icon representing a service available for use by the user.

* * * * *